(12) United States Patent
Akami et al.

(10) Patent No.: US 6,795,259 B2
(45) Date of Patent: Sep. 21, 2004

(54) LENS BARREL

(75) Inventors: Noboru Akami, Chigasaki (JP); Takao Goto, Tokyo-to (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/396,316

(22) Filed: Mar. 26, 2003

(65) Prior Publication Data

US 2003/0210480 A1 Nov. 13, 2003

(30) Foreign Application Priority Data

Mar. 28, 2002 (JP) ........................................ 2002-091717
Jul. 29, 2002 (JP) ........................................ 2002-219461

(51) Int. Cl.[7] ................................................ G02B 7/02
(52) U.S. Cl. ........................ 359/823; 359/699; 359/700
(58) Field of Search ................................. 359/699, 700, 359/701, 703, 704, 823

(56) References Cited

U.S. PATENT DOCUMENTS 6,288,855 B1 * 9/2001 Devenyi ..................... 359/830

FOREIGN PATENT DOCUMENTS

JP      11-023937       1/1999

* cited by examiner

*Primary Examiner*—Georgia Epps
*Assistant Examiner*—M. Hasan
(74) *Attorney, Agent, or Firm*—Miles & Stockbridge P.C.

(57) ABSTRACT

A lens barrel comprises a first cylindrical member having an inner peripheral surface, and a second cylindrical member internally fitted to the first cylindrical member and having an outer peripheral surface. One of the peripheral surfaces has first and second helical parallel axial grooves, and a third groove extending in only a circumferential direction continuously from one side ends of the first and second grooves. The other peripheral surface has first and second protruded portions engaging respectively with the first and second grooves in alignment in the circumferential direction and enabling relative rotations between the cylindrical members and relative movements in the axial direction. When the third groove is reached, the cylindrical members are allowed to make only relative rotations without moving in the axial direction.

14 Claims, 17 Drawing Sheets

LENS BARREL

This application claims the benefit of Japanese Patent applications No. 2002-091717 and No. 2002-219461 which are hereby incorporated by reference.

BACKGROUND OF THE INVENTION

1. Field of the Invention

The present invention relates to a lens barrel structured to extract a straight advancing motion from a rotary motion of a frame member and to perform an operation such as a lens extension, etc.

2. Related Background Art

In this type of lens barrel, a lens extension-and-reduction mechanism has hitherto been constructed of a multi-thread screw called a helicoid or a cam mechanism configured by cam pins and cam grooves.

FIG. 13 is a view showing the helicoid in development in one conventional lens barrel.

In this conventional lens barrel, a female helicoid member 10 having a female helicoid includes a first guide groove 10a for moving back and forth in the optical-axis directions corresponding to rotations, and a second guide groove 10b (a lead-0 portion) defined as a groove formed in a circumferential direction in continuation with the first guide groove 10a.

FIG. 14 is a partially enlarged view of FIG. 9.

A male helicoid member 20 having a male helicoid engaging with the female helicoid of the female helicoid member 10, has a guide protruded portion 200 configured by surfaces 20a, 20b facing to the first guide groove 10a, and surfaces 20c, 20d facing to the second guide grooves 10b (the lead-0 portion).

The male helicoid member 20, when making the relative rotary motion to the female helicoid member 10 by the rotation of the female helicoid member 10, through engaging with the first guide groove 10a, moves in the optical-axis direction corresponding to the rotation. In an area of the second guide groove 10b (the lead-0 portion), the relative movement in the direction of rotation is made, however, no movement in the optical-axis direction is made. The function of the second guide grove 10b is, as disclosed in, for example, Japanese Patent Application Laid-Open No.11-23937, utilized for opening and closing a lens barrier.

FIGS. 15 through 17 are views showing a helicoid of another conventional lens barrel in development.
In this conventional lens barrel, a female helicoid member 10 having a female helicoid includes a helical groove 10a for moving back and forth in the optical-axis directions corresponding to rotations, and a circumferential groove 10b defined as a groove formed in the circumferential direction in continuation with the helical guide groove 10a.

A male helicoid member 20, when making the relative rotary motion to the female helicoid member 10 by the rotation of the female helicoid member 10, through engaging with the first guide groove 10a, moves in the optical-axis direction corresponding to the rotation. In the circumferential groove lob, the relative movement in the direction of rotation is made, however, no movement in the optical-axis direction is made.

What is required of the conventional lens barrel described above is a contrivance for preventing the operation from becoming unstable due to interference with the helical groove 10a when the protruded portion of the male helicoid member 20 passes through the circumferential groove 10b.

Further, it is also required that an incorrect helical engagement with an adjacent groove different from the predetermined position be avoided.

For meeting these requests, there has hitherto been adopted a configuration that the number of grooves is restricted, and the grooves are thinned out.

Moreover, the helicoid engagement is established by decreasing a length (an angle of rotation) of the circumferential groove 10b.

Accordingly, the helicoid is unable to be disposed along the entire periphery, and an engaging area is reduced, resulting in a drop of engaging force. When receiving an external force, the helicoid might come off the engagement thereof.

Further, in an area where the helicoid engagement is attained, it is possible to shield the light that is to leak through a gap between the female helicoid member 10 and the male helicoid member 20. In an area where the helicoid engagement is not attained, however, a problem arises, wherein the light-shielding can not be performed, and a light shielding means is needed.

A further problem is that a non-groove area of the inner periphery of the female helicoid member 10 expands, and, when a beam of light is projected on this area, an intensive reflection occurs to cause a flare.

A still further problem is that the helicoid engaging areas can be provided merely in approximately three directions on the circumference because of the configuration of thinning out the helicoid grooves, and ununiform rotations are caused due to sinking in a recessed portion, etc. necessary for a secant relief of a die assembly, which is provided in the inner periphery of the female helicoid member 10.

A yet further problem is that the priority given to establishing the small number of engaging areas conduces to a restraint in terms of design.

SUMMARY OF THE INVENTION

It is a primary object of the present invention to provide a lens barrel capable of being formed with a multiplicity of grooves, attaining a stable helical engagement, obtaining a high engagement force, exhibiting an excellent light shielding characteristic and making difficult occurrences of the caused-by-stray-light flare, ghost, etc.

To accomplish the above object, according to one aspect of the present invention, a lens barrel includes a first cylindrical member having an inner peripheral surface, and a second cylindrical member internally fitted to the first cylindrical member and having an outer peripheral surface that facing in a radial direction to the inner peripheral surface of the first cylindrical member, wherein any one of the inner peripheral surface and the outer peripheral surface is formed with first and second grooves taking a helical shape and extending in an axial direction in parallel with each other, and a third groove extending in only a circumferential direction continuously from one side ends of the first and second grooves, the other of the inner peripheral surface and the outer peripheral surface are formed with first and second protruded portions engaging respectively with the first and second grooves in alignment in the circumferential direction and enabling relative rotations between the first and second cylindrical members and relative movements in the axial direction therebetween, the first and second protruded portions engage respectively with the first and second grooves with the result that the first and second cylindrical members make the relative rotations and the relative movements in the axial direction, and, when reaching the third groove, move through within the third groove, and the first and second cylindrical members are allowed to make only the relative rotations without moving in the axial direction, and the third groove includes a guide portion, formed in continuation from the first groove, for guiding the first protruded portion into the first groove.

In the lens barrel according to the present invention, preferably the second groove includes a portion, formed adjacent to the third groove, for inhibiting the first protruded portion from entering.

In the lens barrel according to the present invention, preferably a height of the first protruded portion is larger than a height of the second protruded portion, and the entrance inhibiting portion of the second groove has a depth set to permit the second protruded portion to pass through and to inhibit the first protruded portion from passing through.

In the lens barrel according to the present invention, preferably the guide portion is a groove bottom portion formed, in the third groove, having a depth set to permit the second protruded portion to pass through and to inhibit the first protruded portion from passing through.

In the lens barrel according to the present invention, preferably a length of the first protruded portion in an extending direction of the helical groove is larger than a length of the second protruded portion in the extending direction thereof, and a length of the third groove in the extending direction of the helical groove is larger than the length of the protruded portion on one side of the circumferential direction continuous with the first groove.

According to another aspect of the present invention, a lens barrel includes a first helicoid member including a high guide protruded portion provided on an inner surface or an outer surface of a cylinder and a low guide protruded portion lower in height than the high guide protruded portion, and a second helicoid member including a plurality of first guide grooves and a second guide groove that engage with the high guide protruded portion and/or the low guide protruded portion of the first helicoid member, the first guide grooves being formed in a helical shape on an engaging surface of the first helicoid member, the second guide groove being formed continuously with the first guide grooves in a circumferential direction, wherein the second guide groove partially includes a second middle guide groove, for abutting on the high guide protruded portion and guiding the same high guide protruded portion, formed in depth set to permit the low guide protruded portion to pass through and to make the high guide protruded portion unable to pass through so that the engagement between the first helicoid member and the second helicoid member is changed over from the engagement through the second guide groove to the engagement through the first guide grooves.

In the last mentioned lens barrel according to said another aspect of the present invention, preferably among the plurality of first guide grooves, the guide groove with which the low guide protruded portion engages includes a first middle guide groove formed in depth set to make the high guide protruded portion unable to pass through so as to inhibit the high guide protruded portion from entering and to enable the low guide protruded portion to pass through.

According to a further aspect of the present invention, a lens barrel includes a first cylindrical member, and a second cylindrical member fitted to the first cylindrical member, the first and second cylindrical members operating so as to consecutively change over a helical movement of moving along an axis of rotation while relatively rotating and a circumferential movement of making relative rotations with no movement in the direction along the axis of rotation, wherein the second cylindrical member includes a first crested portion and a second crested portion, and said first cylindrical member includes a first helical groove engaging with the first crested portion when making the helical movement, and a second helical groove provided adjacent to the first helical groove and engaging with the second crested portion, and the first and second crested portions make relative movements through the circumferential movement to positions to which the adjacent grooves are extended, and the second cylindrical member further includes guide portions for abutting on the first crested portion or the second crested portion and guiding the first and second crested portions so that the first crested portion and the second crested portion advance into the first helical groove and the second helical groove when changing over to the helical movement from the circumferential movement.

In the last mentioned lens barrel according to said further aspect of the present invention, preferably the first cylindrical member includes a first circumferential groove through which the first crested portion moves when making the circumferential movement, and a second circumferential groove through which the second crested portion moves when making the circumferential movement, the first crested portion is shorter in length in the direction along the axis of rotation than the second crested portion, and the first circumferential groove is narrower, enough not to permit the second crested portion to pass through, in width in the direction along the axis of rotation than the second circumferential groove.

In the last mentioned lens barrel according to said further aspect of the present invention, preferably the first cylindrical member includes a helical movement guide portion, formed in the vicinity of a boundary between the first circumferential groove and the second circumferential groove, for guiding the changeover from the circumferential movement to the helical movement in such a way that the second crested portion abuts thereon.

In the last mentioned lens barrel according to said further aspect of the present invention, preferably the first cylindrical member includes a circumferential movement guide portion, formed on the extension of the first helical groove and in the vicinity of the first circumferential groove, for guiding the changeover from the helical movement to the circumferential movement in such a way that the second crested portion abuts thereon.

In the last mentioned lens barrel according to said further aspect of the present invention, preferably the first cylindrical member includes a third crested portion formed in a range defined by the first helical groove, the second helical groove and the first circumferential groove, a fourth crested portion formed in a range defined by the first helical groove, the second helical groove and the second circumferential groove, and a fifth crested portion provided in a position facing to the third crested portion with the first circumferential groove interposed therebetween, the circumferential movement guide portion is formed by the fifth crested portion, and the helical movement guide portion is formed by the third crested portion and the fifth crested portion.

DETAILED DESCRIPTION OF THE PREFERRED EMBODIMENTS

Embodiments of the present invention will hereinafter be described with reference to the accompanying drawings.

FIGS. 1 through 8 are explanatory views each showing a lens barrel in a first embodiment of the present invention.

Figure 5:
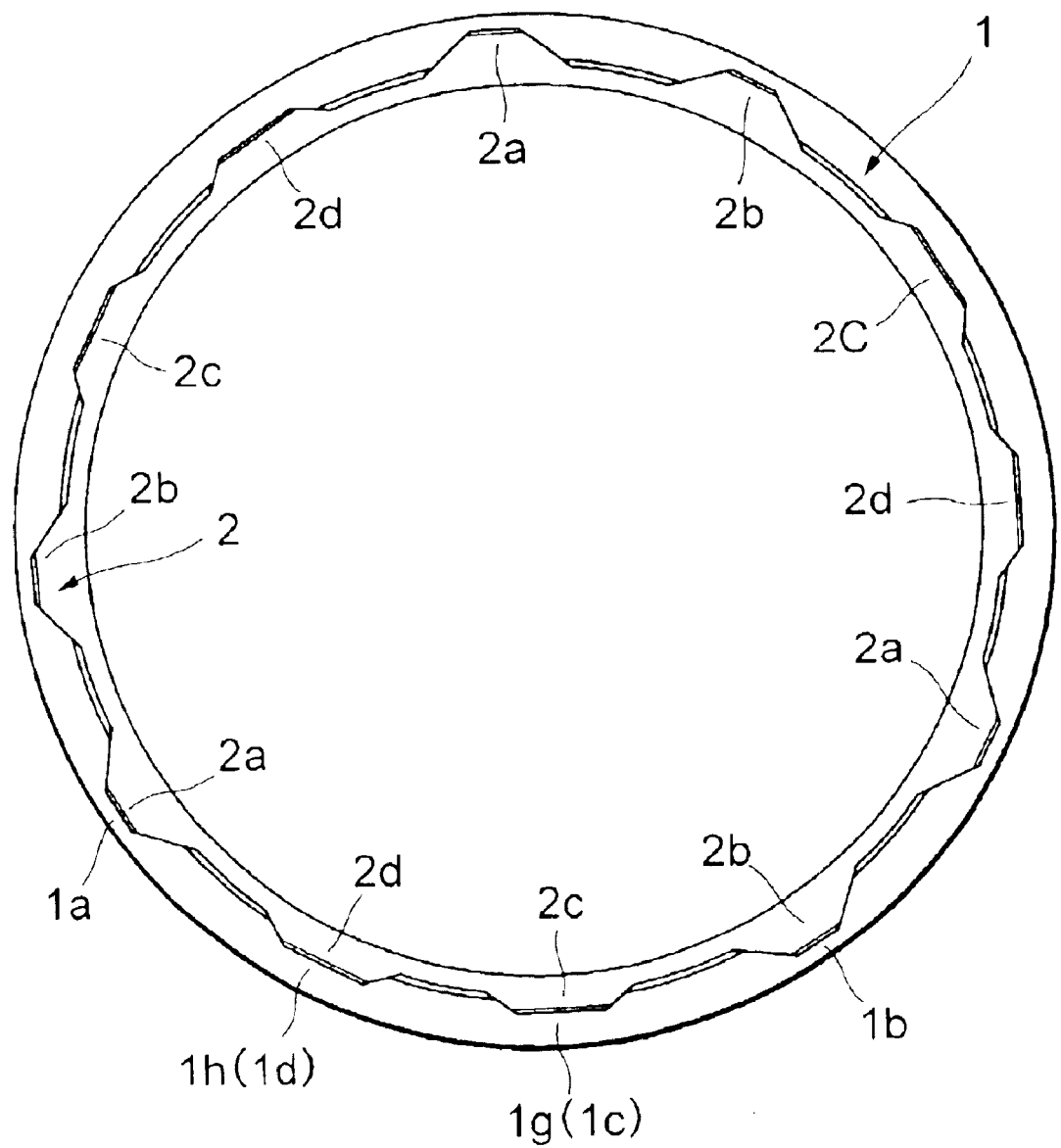
FIG. 5 is a sectional view showing a state where the male helicoid member 2 engages with the female helicoid member 1 in a position on the A—A section in FIG. 3.

The lens barrel in the first embodiment is constructed of, as shown in FIG. 5, a cylindrical female helicoid member 1 having helicoid grooves formed along an inner periphery that will be explained later on, and a male helicoid member 2 fitted in this female helicoid member 1 and including protruded portions so formed along an outer periphery as to be engaged with the helicoid grooves. With a known configuration, the female helicoid member 1 is rotatably provided on a fixing member of the lens barrel, while the male helicoid member 2 capable of only moving straight in optical-axis directions in a way that inhibits its rotations by an unillustrated rotation restriction mechanism.

Figure 1:
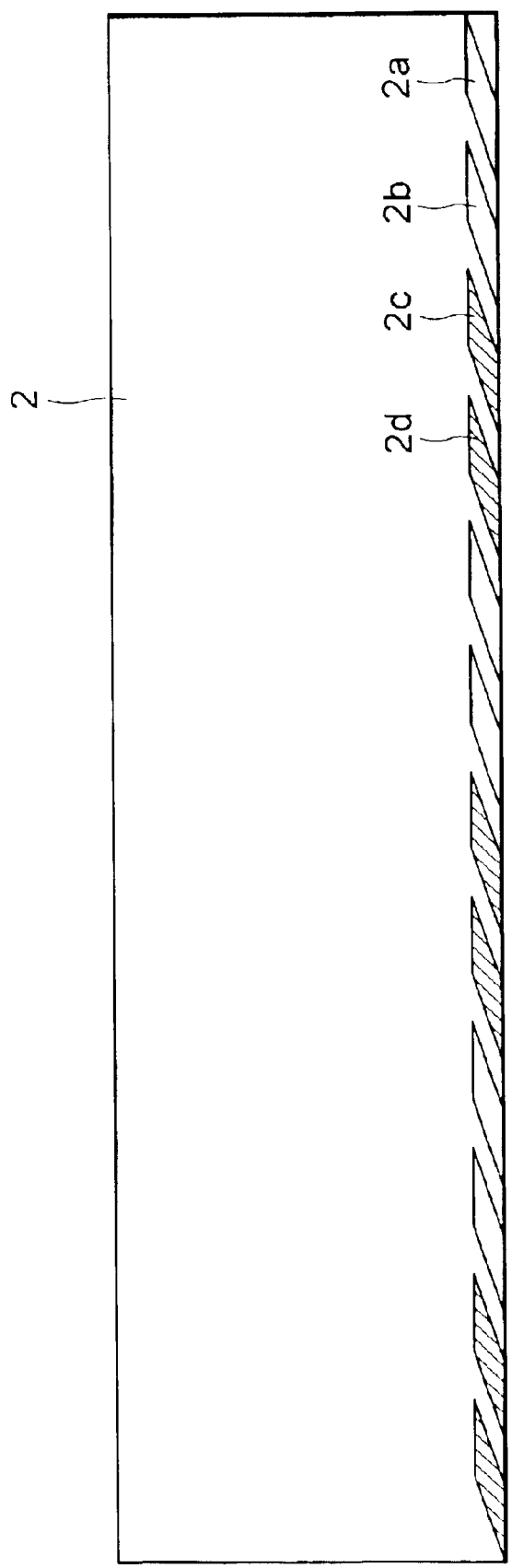
FIG. 1 is a development showing a male helicoid member 2 included in a lens barrel of a first embodiment of the present invention.

FIG. 1 is a development showing the male helicoid member 2 included in the lens barrel in the first embodiment of the present invention.

Figure 2:
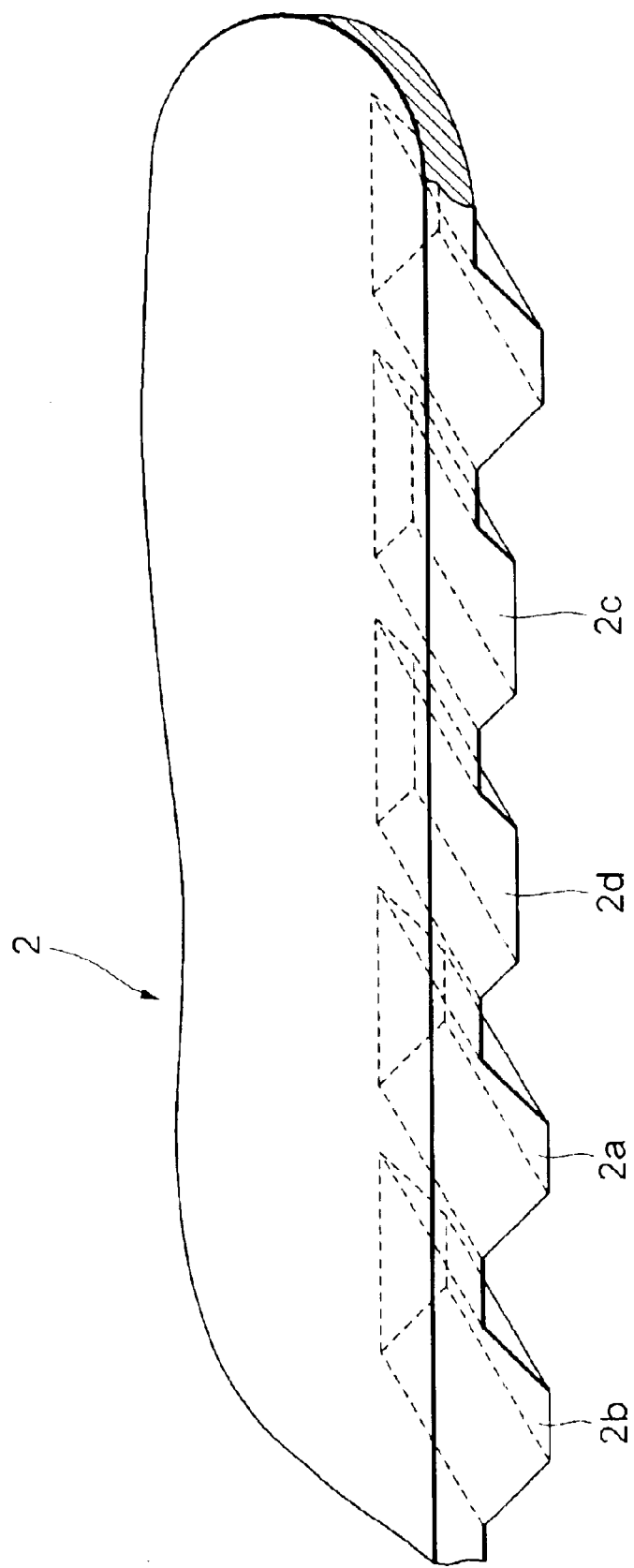
FIG. 2 is an enlarged perspective view showing the male helicoid member 2 in development.

FIG. 2 is an enlarged perspective view showing the male helicoid member 2 in enlargement.

The male helicoid member 2 takes substantially a cylindrical shape and includes totally twelve pieces of high guide protruded portions 2a, 2b and low guide protruded portions 2c, 2d lower in height (protruded quantity) than the high guide protruded portions 2a, 2b, wherein these protruded portions are each provided in this sequence by three sets along the outer peripheral portion. The male helicoid member 2 makes helicoid-engagement with the female helicoid member 1 and is this driven as a first helicoid member.

Figure 3:
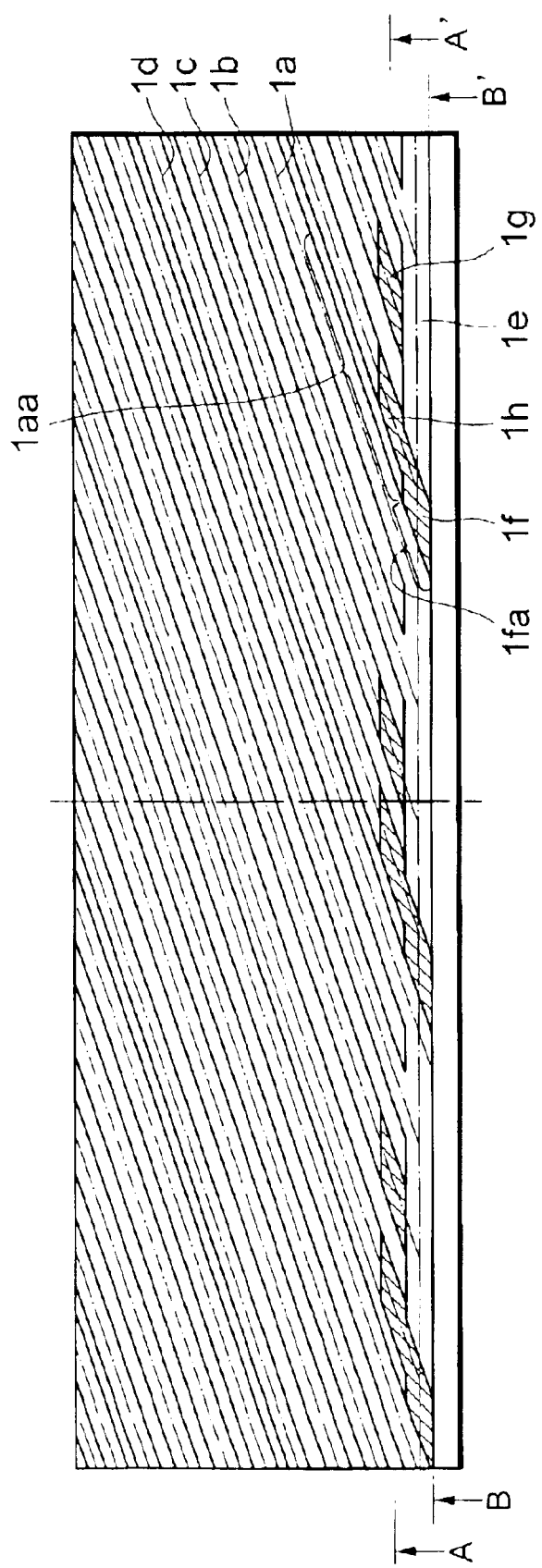
FIG. 3 is a development showing a female helicoid member 1 included in the lens barrel of the present invention.

FIG. 3 is a development of the female helicoid member 1 included in the lens barrel in the first embodiment of the present invention.

Note that the grooves are depicted by one-dotted chain lines in FIG. 3 and developments that will hereinafter be shown.

Figure 4:
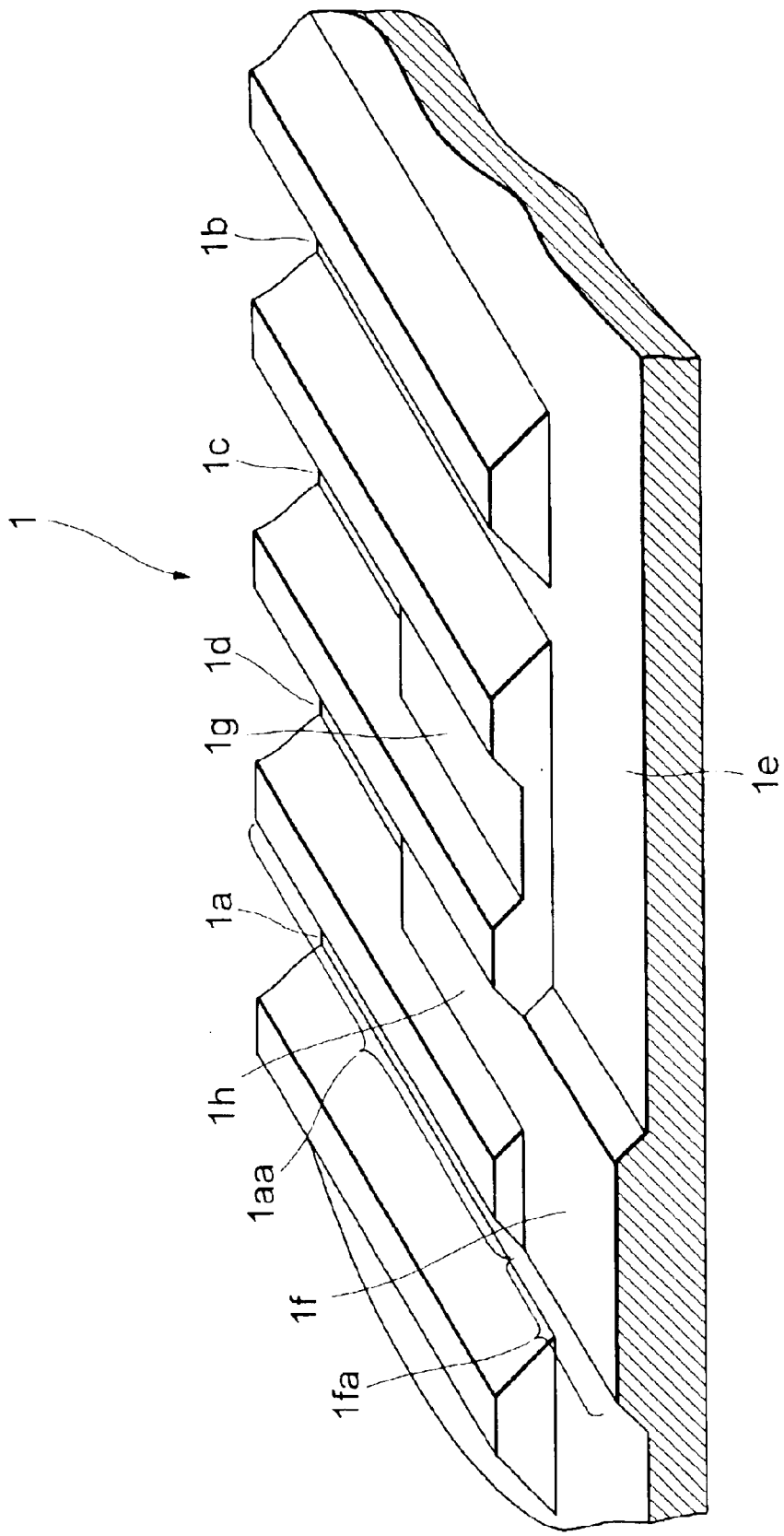
FIG. 4 is an enlarged perspective view showing the female helicoid member 1 in development.

FIG. 4 is an enlarged perspective view illustrating the female helicoid member 1 in enlargement.

The female helicoid member 1 is defined as a second helicoid member including first guide grooves (1a through 1d) and a second guide groove 1e formed along the inner periphery of the cylinder.

The female helicoid member 1 has totally twelve grooves, wherein the first guide grooves (1a through 1d) are each formed by three grooves in the inner periphery of the cylinder thereof.

FIG. 5 is a sectional view showing a state where the male helicoid member 2 engages with the female helicoid member 1 in a position on the section A—A in FIG. 3.

Among the first guide grooves (1a through 1d), the helical grooves 1c, 1d engaging with the low guide protruded portions 2c, 2d are provided with first middle guide groove portions 1g, 1h having groove depths so set as to inhibit the high guide protruded portions 2a, 2b from moving therethrough so that the high guide protruded portions 2a, 2b do not enter and to permit the low guide protruded portions 2c, 2d to move therethrough.

The second guide groove 1e is continuous with the first guide grooves (1a through 1d) and is formed in a direction substantially orthogonal to a central axis of rotation of the female helicoid member 1 (the central axis of rotation is substantially coincident with the optical axis in this embodiment).

Figure 6:
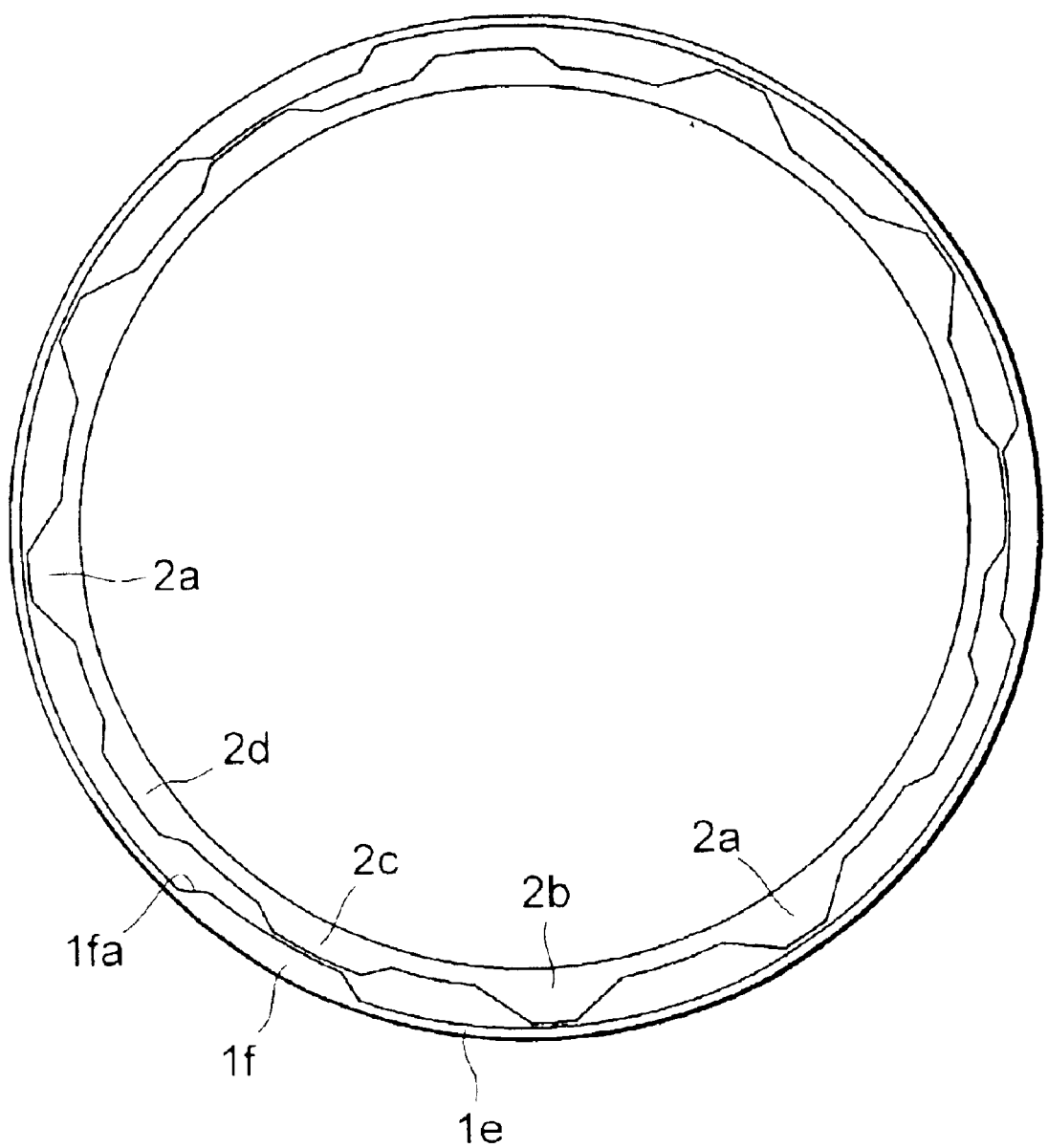
FIG. 6 is a sectional view showing a state where the male helicoid member 2 engages with the female helicoid member 1 in a position on the B—B section in FIG. 3.

FIG. 6 is a sectional view showing a state where the male helicoid member 2 engages with the female helicoid member 1 in a position on the section B—B in FIG. 3.

The second guide groove 1e partially has a second middle guide groove 1f, having a depth so set as to permit the low guide protruded portions 2c, 2d to move therethrough and to inhibit the high guide protruded portions 2a, 2b from moving therethrough, so the second middle guide groove 1f abuts on the high guide protruded portion 2a and guide the male helicoid member 2 so that the protruded portions 2a through 2d are changed over to the engagements with the first guide grooves (1a through 1d) from the engagement with the second guide groove 1e. For this purpose, the second middle guide groove if is formed with an inclined surface 1fa continuous with an inclined surface 1aa of the helical groove 1a.

When the male helicoid member 2 makes the helicoid-engagement (at the first guide grooves (1a through 1d)) with the female helicoid member 1, the male helicoid member 2 moves in the axial directions with the mutual rotations. Further, when engaging with the second guide groove 1e, the position in the axial direction remains unchanged even if the mutual rotations occur.

The high guide protruded portions 2a, 2b and the low guide protruded portions 2c, 2d of the male helicoid member 2 continuously move between the first guide grooves (1a through 1d) and the second guide groove 1e of the female helicoid member 1. At this time, the first middle guide grooves 1g, 1h and the second middle guide groove 1f function effectively. This point will hereinafter be discussed.

Figure 7:
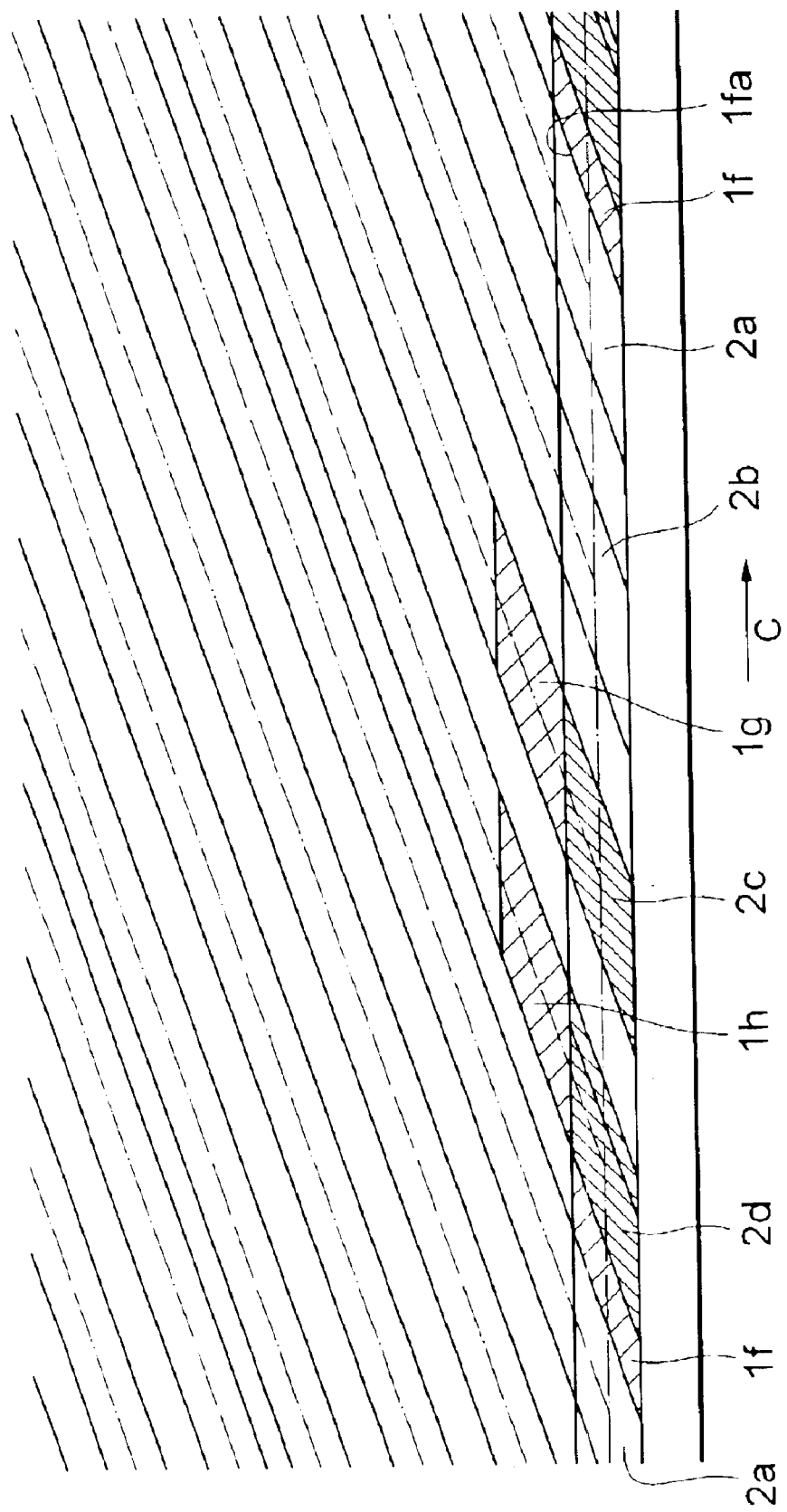
FIG. 7 is a perspective development showing a state where the male helicoid member 2 engages with the female helicoid member 1 and a state where a high guide protruded portion 2a abuts on an inclined surface 1fa of a second middle guide groove if.

FIG. 7 is a perspective development showing a state the male helicoid member 2 engages with the female helicoid member 1. The high guide protruded portion 2a of the male helicoid member 2 abuts on the inclined surface 1fa of the second middle guide groove 1f of the female helicoid member 1.

The male helicoid member 2 moves in an arrow direction C, and, as in the state shown in FIG. 7, the high guide protruded portion 2a abuts on the inclined surface 1fa of the second middle guide groove 1f. Thereupon, the male helicoid member 2 is unable to rotate directly in the arrow direction C but is guided by the inclined surface 1fa. Then, a crested portion of the guide protruded portion 2a moves forward along the inclined surface 1fa, and the guide protruded portions 2a through 2d respectively move to the first guide grooves. At this time, the portions with which the low guide protruded portions 2c, 2d engage are formed with the first middle guide grooves 1g, 1h, however, the heights thereof are so set as to enable them to pass through each other, and hence these portions can enter directly.

Figure 8:
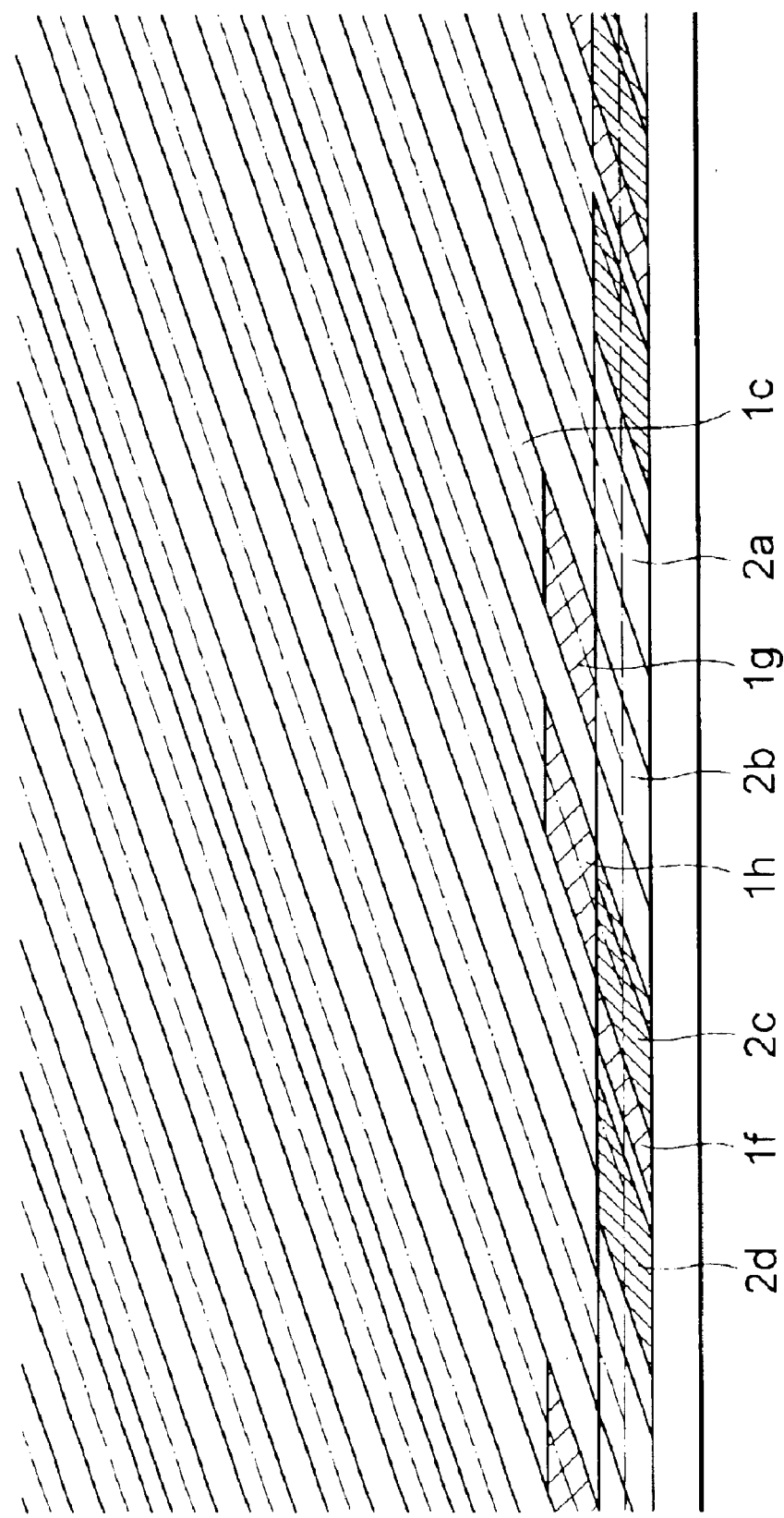
FIG. 8 is a perspective development showing a state where the male helicoid member 2 engages with the female helicoid member 1 and a state where a high guide protruded portion 2b exists in a position corresponding to a helical groove 1c (a first middle guide groove 1g)

FIG. 8 is a perspective development illustrating a state where the male helicoid member 2 engages with the female helicoid member 1 and also a state where the high guide protruded portion 2b exists in a position corresponding to the helical groove 1c (the first middle guide groove 1g).

At this time, the high guide protruded portion 2b abuts on the first middle guide groove 1g and is unable to enter this helical groove 1c. Accordingly, the male helicoid member 2 moves to the position shown in FIG. 7 and comes to engage with predetermined grooves.

In the second guide groove 1e, the low guide protruded portions 2c, 2d do not interfere with the second middle guide groove 1f, and therefore the configuration described above can be adopted.

According to the first embodiment, the number of the helicoid grooves can be increased, whereby the helical engagement state can be stabilized and a binding force can be enhanced.

Further, the female helicoid member 1 and the male helicoid member 2 engage with each other substantially over the entire periphery of the cylinder, thereby making it possible to improve a light shielding characteristic against the light entering from between the cylinders.

Further, the flat area of the inner periphery of the female helicoid member 1 is reduced with the result that an amount of reflection of the light reflected from the flat area, and a flare and a ghost can be reduced.

The first embodiment has exemplified the helicoid, however, a so-called cam mechanism based on engagement between a cam pin and a cam groove is also available without being limited to the helicoid.

Next, a second embodiment of the present invention will be explained in greater detail.

Figure 9:
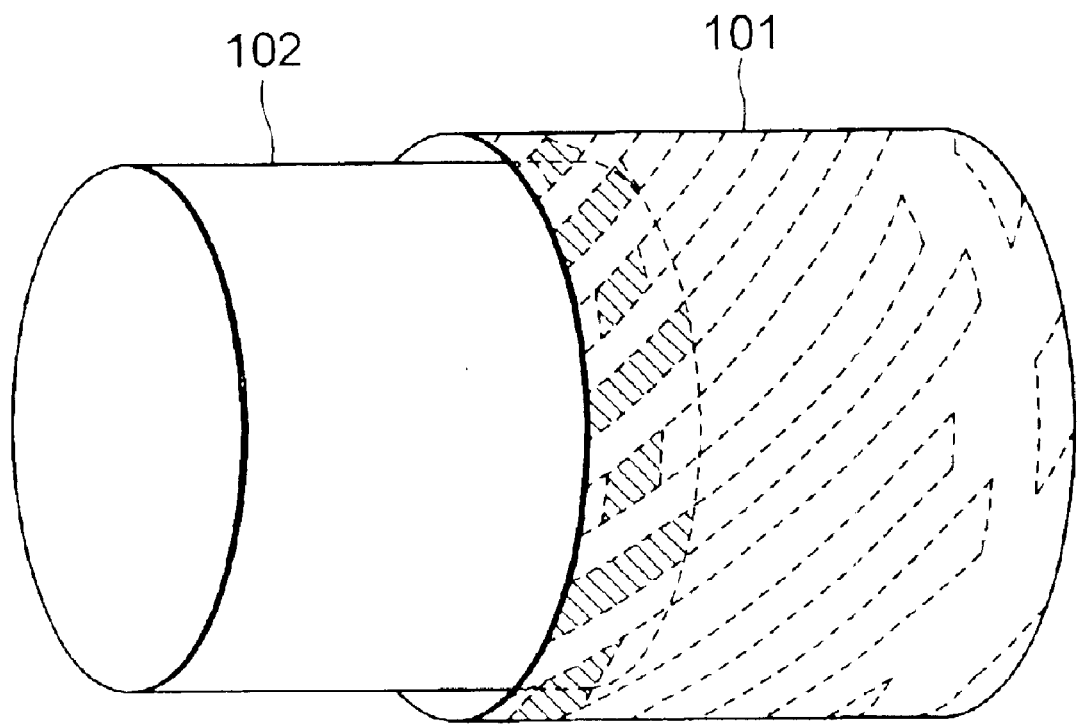
FIG. 9 is a view showing a second embodiment of the lens barrel of the present invention.

FIG. 9 is a schematic view showing the second embodiment of the lens barrel of the present invention.

The lens barrel in the second embodiment operates in such a way that a female helicoid member (a first cylindrical member) 101 is combined with a male helicoid member (a second cylindrical member) 102, and the female helicoid member 101 thus rotates, whereby the male helicoid member 102 continuously changes over, as will be explained later on, between a helical movement relative to the female helicoid member 101 (which is, i.e., a rectilinear movement in the optical-axis direction as the center of rotation) and a circumferential movement.

Figure 10:
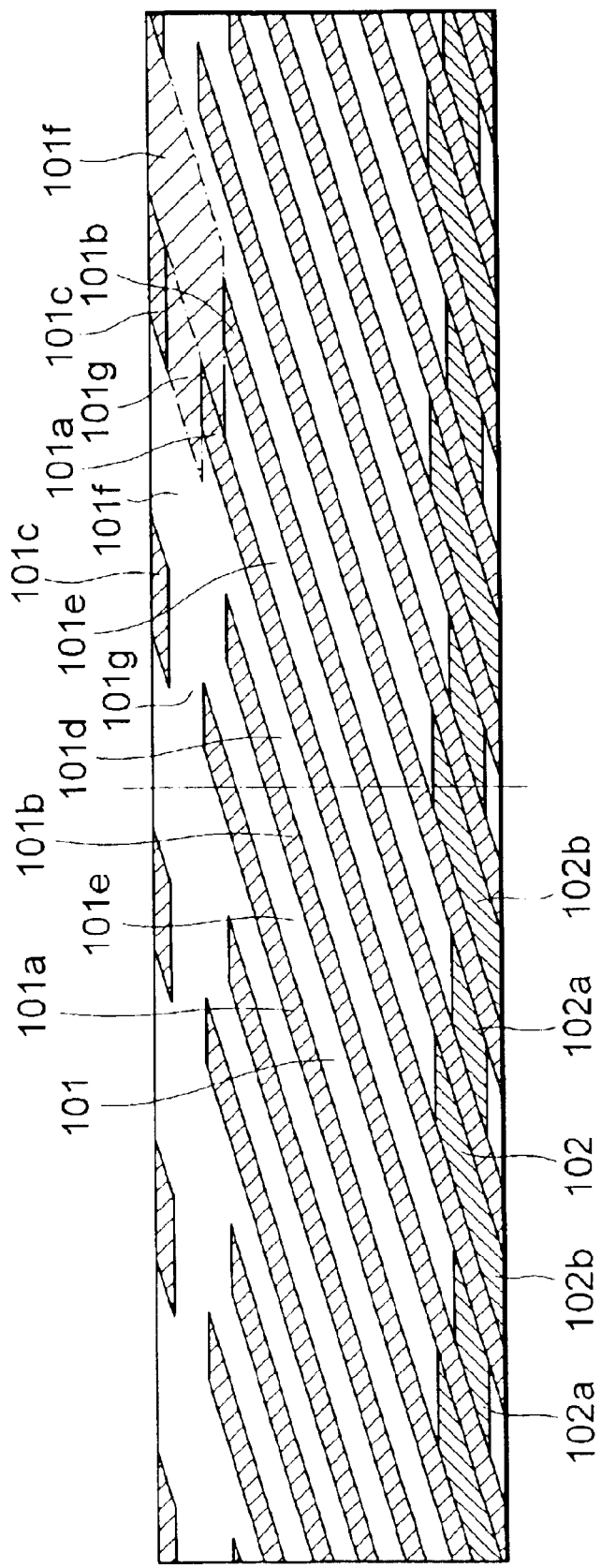
FIG. 10 is a development showing the second embodiment of the lens barrel of the present invention.

FIG. 10 is a development showing the lens barrel in the second embodiment.

The female helicoid member 101 includes a third crested portion 101a, a fourth crested portion 101b, a fifth crested portion 10c, a first helical groove 101d, a second helical groove 101e, a first circumferential groove 101g and a second circumferential groove 10f.

The male helicoid member 102 has a first crested portion 102a and a second crested portion 102b, and is so provided as to be capable of moving straight only with its rotation regulated by an unillustrated straight movement guide mechanism.

A first helical groove 101d of the female helicoid member 101 is engaged with the first crested portion 102a of the male helicoid member 102. A second helical groove 101e of the female helicoid member 101 is engaged with the second crested portion 102b of the male helicoid member 102. With these helicoid engagements, the female helicoid member 101 and the male helicoid member 102 make relative rotations, and the male helicoid member 102 rectilinearly moves in a direction along the center of rotation (which will hereinafter be termed a straight moving direction).

On the inner peripheral surface of the female helicoid member 101, a crested portion formed between the first helical groove 101d and the second helical groove 101e includes two types of crested portions, i.e., a third crested portion 101a formed in a range defined by the first helical groove 101d, the second helical groove 101e and a first circumferential groove 101g, and a fourth crested portion 101b formed in a range defined by the first helical groove 101d, the second helical groove 101e and a second circumferential groove 101f.

The first circumferential groove 101g of the female helicoid member 101 corresponds to the first crested portion 102a of the male helicoid member 102. The second circumferential groove 101f corresponds to the second crested portion 102b. A width of the first circumferential groove 101g in the straight moving direction is an engagement dimension corresponding to a width of the first crested portion 101a in the straight moving direction. Accordingly, when the first circumferential groove 101g engages with the first crested portion 102a, the female helicoid member 101 and the male helicoid member 102 can not move relatively in the straight moving direction and therefore make the relative rotational movements (circumferential movements). Namely, even when the female helicoid member 101 is rotated, the male helicoid member 102 does not move. Note that a width of the second circumferential groove 101f in the straight moving direction is well larger than a width of the second crested portion 102b in the straight moving direction.

The first crested portion 102a is shorter in the straight moving direction than the second crested portion 102b. Further, the first circumferential groove 101g is narrower in width in the straight moving direction than the second circumferential groove 10f. Hence, the second crested portion 102b is unable to pass through the first circumferential groove 101g.

According to the second embodiment, the first crested portion 102a and the second crested portion 102b of the male helicoid member 102 make the relative movements up to positions to which the adjacent helicoid grooves extend through the circumferential movements. For this purpose, the first circumferential groove 101g and the second circumferential groove 101f are formed on the extensions of the third crested portion 101a and the fourth crested portion 101b of the male helicoid member 101. A fifth crested portion 101c is formed substantially on the extension of the third crested portion 101a. The first circumferential groove 101g is formed in a position interposed between the third crested portion 101a and the fifth crested portion 101c.

Next, an operation of the lens barrel in the second embodiment will be discussed.

(Helical Movement)

FIG. 10 illustrates a state the crested portions 102a, 102b of the male helicoid member 102 make helical movements with respect to the female helicoid member 101. When making the helical movements, the first crested portion 102a is engaged with the first helical groove 110d while the second crested portion 102b is engaged with the second helical groove 101e, and the male helicoid member 102 moves in the straight moving direction while rotating relatively to the female helicoid member 101.

(Changeover from Helical Movement to Circumferential Movement)

Figure 11:
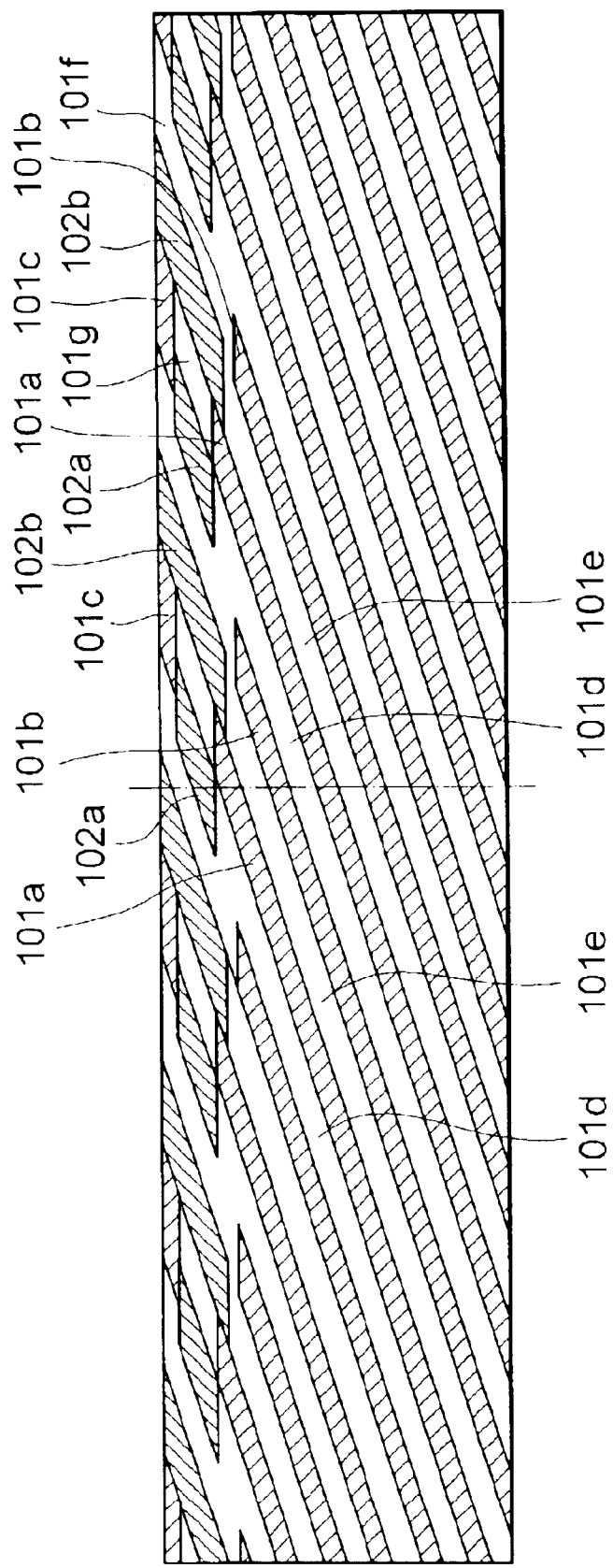
FIG. 11 is a development showing a state when changed over from a helical movement to a circumferential movement.

FIG. 11 is a development showing a state when the helical movement is changed over to the circumferential movement.

When moved to the state shown in FIG. 11 from the state in FIG. 10, the first crested portion 102a disengages from the first helical groove 101d, and the second crested portion 102b disengages from the second helical groove 10e. Further, simultaneously when disengaging therefrom, the first crested portion 102a abuts on the fifth crested portion 10c, and it follows that the male helicoid member 102 makes only the rotational movement relatively to the female helicoid member 101. In this case, the fifth crested portion 101c functions as a circumferential movement guide portion for guiding the changeover from the helical movement to the circumferential movement.

(Circumferential Movement)

Figure 12:
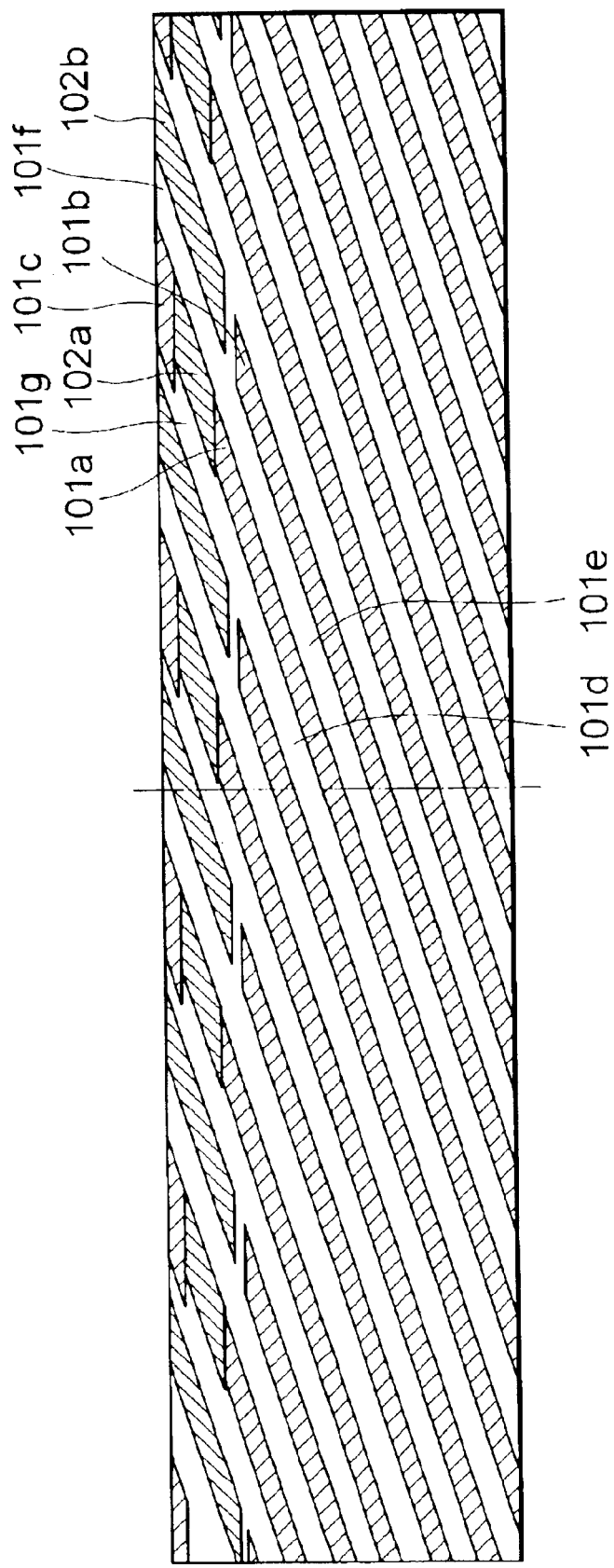
FIG. 12 is a view showing a state when making the circumferential movement.
Figure 13:
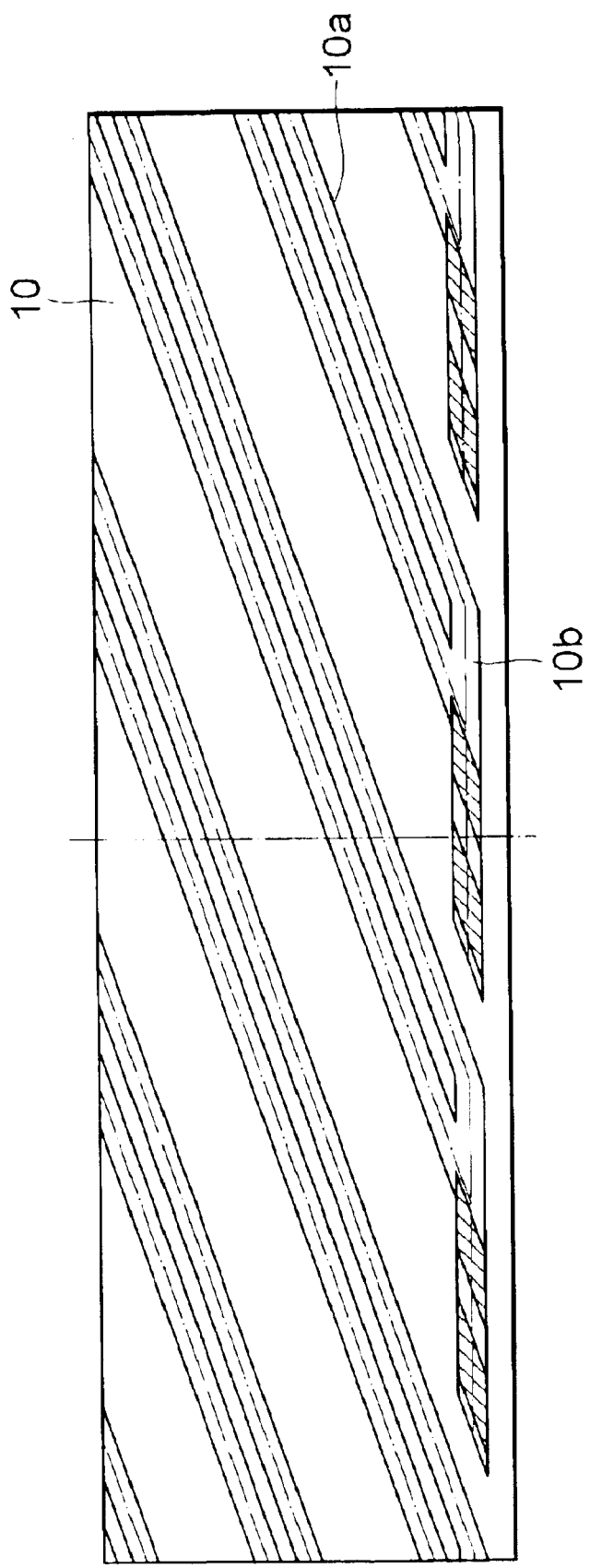
FIG. 13 is a view showing a helicoid of a conventional lens barrel in development.
Figure 14:
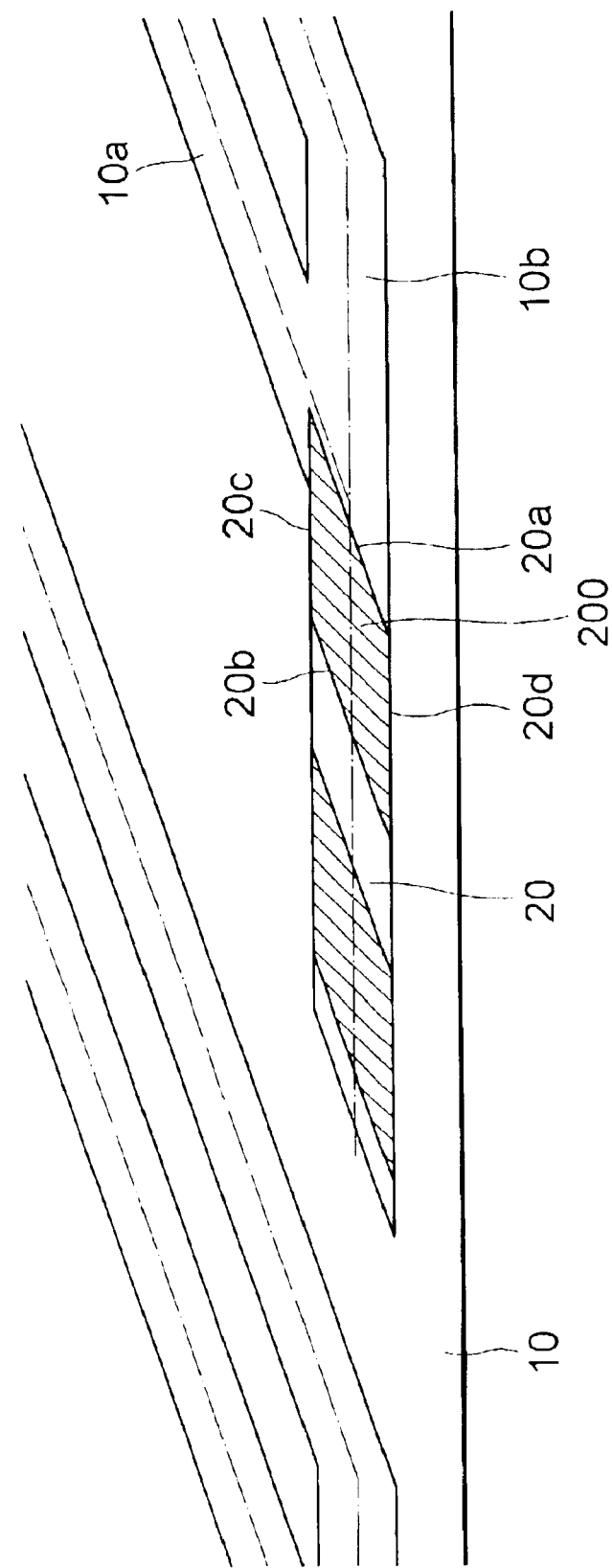
FIG. 14 is a partially enlarged view of FIG. 13.
Figure 15:
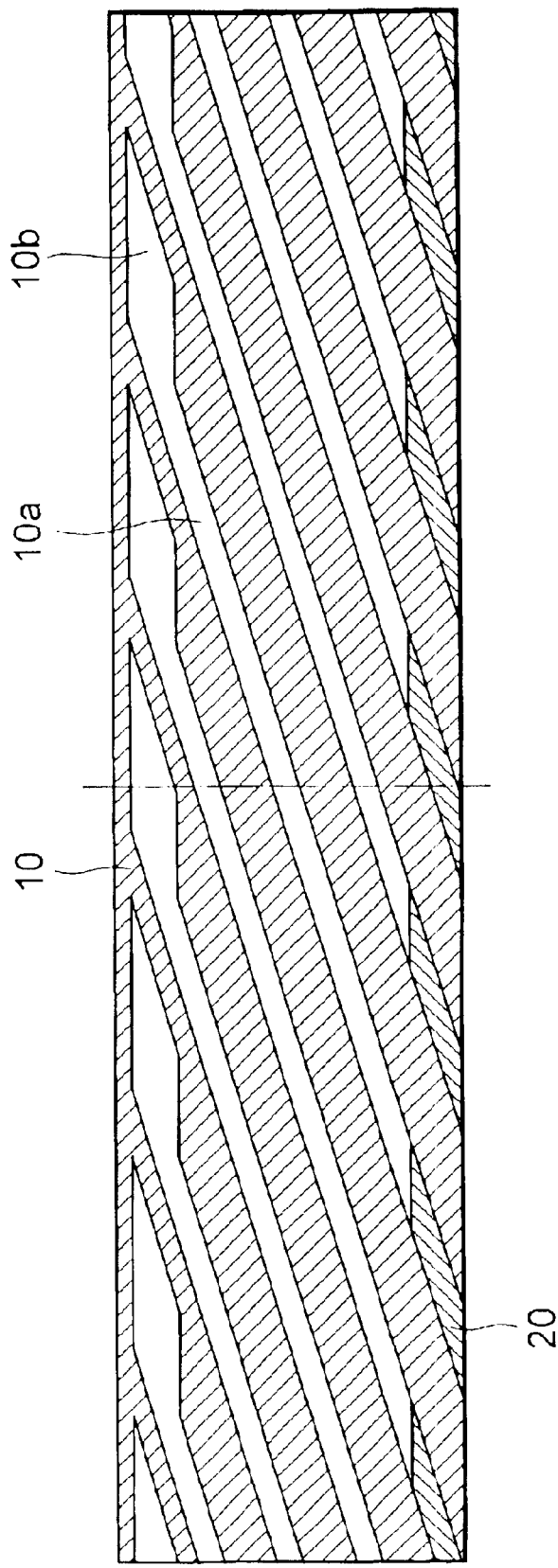
FIG. 15 is a view showing the helicoid of the conventional lens barrel in development.
Figure 16:
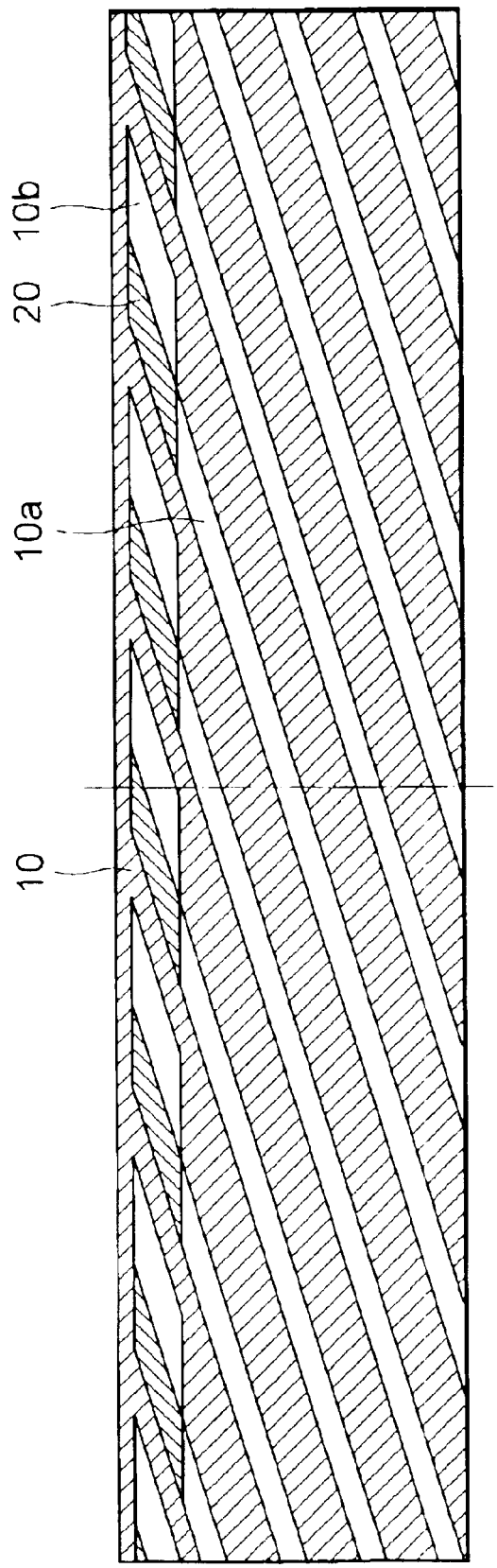
FIG. 16 is a view showing the helicoid of the conventional lens barrel in development.
Figure 17:
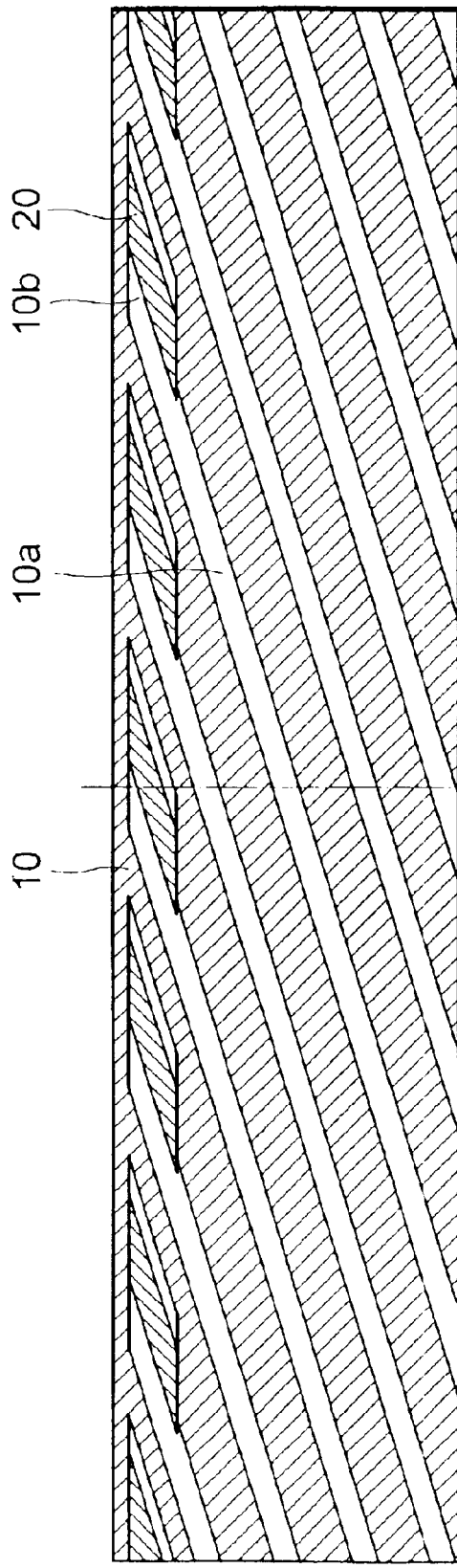
FIG. 17 is a view showing the helicoid of the conventional lens barrel in development.

FIG. 12 is a view showing a state when making the circumferential movement.

When moving the circumferential movement illustrated in FIG. 12, the first crested portion 102a engages with the first circumferential groove 101g, thus regulating a relative position in the straight moving direction. The second crested portion 102b exists on the second circumferential groove 101f when making the circumferential movement but has a gap from the fourth crested portion 101b configuring the second circumferential groove 10f.

(Changeover from Circumferential Movement to Helical Movement)

A state of the changeover from the circumferential movement to the helical movement is the state illustrated in FIG. 11, wherein the direction of the relative rotation is reversed. In this case, the first crested portion 102a and the second crested portion 102b disengage from the first circumferential groove 101g and the second circumferential groove 101f, and simultaneously the second crested portion 102b abuts on the third crested portion 101a and on the fifth crested portion 101c, thus changing over to the helical movement. In this case, the third crested portion 101a and the fifth crested portion 101c function as helical movement guide portions for guiding the changeover from the circumferential movement to the helical movement.

Thus, according to the second embodiment, even if the first crested portion 102a and the second crested portion 102b are structured to make the relative movements to the positions to which the adjacent grooves are extended through the circumferential movements, both of the changeover from the helical movement to the circumferential movement and the changeover from the circumferential movement to the helical movement, can be surely performed. Accordingly, the first circumferential groove 101g and the second circumferential groove 101f can be formed on the extensions of the third crested portion 101a and of the fourth crested portion 101b, whereby the number of grooves can be increased. With this contrivance, it is possible to obtain the lens barrel capable of attaining the stable helical engagement with a high accuracy, exhibiting an excellent light shielding characteristic and making difficult occurrences of the caused-by-stray-light flare, ghost, etc.

The second embodiment has exemplified the case in which the female helicoid member 101 rotates, thereby driving the male helicoid member 102 in the straight moving direction, however, without being limited to this, for example, the female helicoid member may be driven in the straight moving direction by rotating the male helicoid member.

As described in depth, according to the present invention, the multiplicity of grooves can be formed, thereby making it possible to attain the stable helical engagement, exhibit the excellent light shielding characteristic and to make difficult the occurrences of the caused-by-stray-light flare, ghost, etc.

In the above embodiments of the present invention, the first and second guide protruded portions can be prevented from entering the incorrect guide grooves, and, even when forming the multiplicity of guide grooves, the stable operation can be attained.

In the above embodiments of the present invention, the multiplicity of cam grooves can be formed, thereby making it possible to attain the stable helical engagement, exhibit the excellent light shielding characteristic and to make difficult the occurrences of the caused-by-stray-light flare, ghost, etc.

In the above embodiments of the present invention, even when the multiplicity of helical grooves are formed, the stable operation can be attained.

What is claimed is:

1. A lens barrel comprising:
a first cylindrical member having an inner peripheral surface; and
a second cylindrical member internally fitted to said first cylindrical member and having an outer peripheral surface that facing in a radial direction to the inner peripheral surface,
wherein any one of the inner peripheral surface and the outer peripheral surface is formed with first and second grooves taking a helical shape and extending in an axial direction in parallel with each other, and a third groove extending in only a circumferential direction continuously from one side ends of said first and second grooves,
the other of the inner peripheral surface and the outer peripheral surface are formed with first and second protruded portions engaging respectively with said first and second grooves in alignment in the circumferential direction and enabling relative rotations between said first and second cylindrical members and relative movements in the axial direction therebetween,
said first and second protruded portions engage respectively with said first and second grooves with the result that said first and second cylindrical members make the relative rotations and the relative movements in the axial direction, and, when reaching said third groove, move through within said third groove, and said first and second cylindrical members are allowed to make only the relative rotations without moving in the axial direction, and said third groove includes a guide portion, formed in continuation from said first groove, for guiding said first protruded portion into said first groove.

2. A lens barrel according to claim 1, wherein said second groove includes a portion, formed adjacent to said third groove, for inhibiting said first protruded portion from entering.

3. A lens barrel according to claim 1, wherein a height of said first protruded portion is larger than a height of said second protruded portion, and the entrance inhibiting portion of said second groove has a depth set to permit said second protruded portion to pass through and to inhibit said first protruded portion from passing through.

4. A lens barrel according to claim 3, wherein said guide portion is a groove bottom portion formed, in said third groove, having a depth set to permit said second protruded portion to pass through and to inhibit said first protruded portion from passing through.

5. A lens barrel according to claim 1, wherein a length of said first protruded portion in an extending direction of said helical groove is larger than a length of said second protruded portion in the extending direction thereof, and a length of said third groove in the extending direction of said helical groove is larger than the length of said protruded portion on one side of the circumferential direction continuous with said first groove.

6. A lens barrel comprising:

a first helicoid member including a high guide protruded portion provided on an inner surface or an outer surface of a cylinder and a low guide protruded portion lower in height than said high guide protruded portion; and a second helicoid member including a plurality of first guide grooves and a second guide groove that engage with said high guide protruded portion and/or said low guide protruded portion of said first helicoid member, said first guide grooves being formed in a helical shape on an engaging surface with said first helicoid member, said second guide groove being formed continuously with said first guide grooves in a circumferential direction, wherein said second guide groove partially includes a second middle guide groove, for abutting on said high guide protruded portion and guiding the same, formed in depth set to permit said low guide protruded portion to pass through and to make said high guide protruded portion unable to pass through so that the engagement between said first helicoid member and said second helicoid member is changed over from the engagement through said second guide groove to the engagement through said first guide grooves.

7. A lens barrel according to claim 6, wherein among said plurality of first guide grooves, said guide groove with which said low guide protruded portion engages includes a first middle guide groove formed in depth set to make said high guide protruded portion unable to pass through so as to inhibit said high guide protruded portion from entering and to enable said low guide protruded portion to pass through.

8. A lens barrel comprising:

a first cam member including a high cam pin portion provided on an inner surface or an outer surface of a cylinder and a low cam pin portion lower in height than said high cam pin portion; and a second cam member including first cam grooves and a second cam groove that engage with said high cam pin portion and/or said low cam pin portion of said first cam member, said first cam grooves being formed in a helical shape on an engaging surface of said first cam member, said second cam groove being formed continuously with said first cam grooves in a circumferential direction, wherein said second cam groove partially includes a second middle cam groove, for abutting on said high cam pin portion and guiding the same high cam pin portion, formed in depth set to permit said low cam pin portion to pass through and to make said high cam pin portion unable to pass through so that the engagement between said first cam member and said second cam member is changed over from the engagement through said second cam groove to the engagement through said first cam groove.

9. A lens barrel according to claim 8, wherein among said plurality of first cam grooves, said cam groove with which said low cam pin portion engages includes a first middle cam groove formed in depth set to make said high cam pin portion unable to pass through so as to inhibit said high cam pin portion from entering and to enable said low guide cam pin portion to pass through.

10. A lens barrel comprising:

a first cylindrical member; and a second cylindrical member fitted to said first cylindrical member, said first and second cylindrical members operating so as to consecutively change over a helical movement of moving along an axis of rotation while relatively rotating and a circumferential movement of making relative rotations with no movement in the direction along the axis of rotation, wherein said second cylindrical member includes a first crested portion and a second crested portion, said first cylindrical member includes a first helical groove engaging with said first crested portion when making the helical movement, and a second helical groove provided adjacent to said first helical groove and engaging with said second crested portion, and said first and second crested portions make relative movements to positions to which the adjacent grooves are extended through the circumferential movement, and have guide portions for abutting on said first or second crested portion and guiding the first crested portion and said second crested portion so that said first crested portion and said second crested portion advance into said first helical groove and said second helical groove when changing over to the helical movement from the circumferential movement.

11. A lens barrel according to claim 10, wherein said first cylindrical member includes a first circumferential groove through which said first crested portion moves when making the circumferential movement, and a second circumferential groove through which said second crested portion moves when making the circumferential movement, said first crested portion is shorter in length in the direction along the axis of rotation than said second crested portion, and said first circumferential groove is narrower, enough not to permit said second crested portion to pass through, in width in the direction along the axis of rotation than said second circumferential groove.

12. A lens barrel according to claim 11, wherein said first cylindrical member includes a helical movement guide portion, formed in the vicinity of a boundary between said first circumferential groove and said second circumferential groove, for guiding the changeover from the circumferential movement to the helical movement in such a way that said second crested portion abuts thereon.

13. A lens barrel according to claim 12, wherein said first cylindrical member includes a circumferential movement guide portion, formed on the extension of said first helical groove and in the vicinity of said first circumferential groove, for guiding the changeover from the helical movement to the circumferential movement in such a way that said second crested portion abuts thereon.

14. A lens barrel according to claim 13, wherein said first cylindrical member includes a third crested portion formed in a range defined by said first helical groove, said second helical groove and said first circumferential groove, a fourth crested portion formed in a range defined by said first helical groove, said second helical groove and said second circumferential groove, and a fifth crested portion provided in a position facing to said third crested portion with said first circumferential groove interposed therebetween, said circumferential movement guide portion is formed by said fifth crested portion, and said helical movement guide portion is formed by said third crested portion and said fifth crested portion.

* * * * *